Jan. 4, 1938. B. C. PLACE 2,104,239
SPRING FASTENER
Filed Aug. 7, 1935

Inventor
Bion C. Place

By Strauch & Hoffman
Attorneys

Patented Jan. 4, 1938

2,104,239

UNITED STATES PATENT OFFICE 2,104,239

SPRING FASTENER

Bion C. Place, Detroit, Mich., assignor of one-half to George E. Gagnier, Detroit, Mich.

Application August 7, 1935, Serial No. 35,169

1 Claim. (Cl. 85—5)

This invention relates to spring or snap fasteners of the type intended particularly to be sprung in a perforation in a sheet metallic supporting structure. More particularly, the invention is concerned with a spring or snap fastener constructed from a single piece of wire or metal and designed to engage the supporting structure in such positive manner that withdrawal or retraction of the fastener, by a pull in a direction reverse to that by which the fastener was applied, is virtually impossible.

Snap fasteners of types heretofore widely used generally are designed to permit disengagement of the fasteners from the supporting structure so that in effect said fasteners provide merely a readily removable connection between the parts held together by such a fastener, the spring or yield of the portions of the fastener being utilized to permit said portions to yield with respect to each other during retraction of the fastener as well as during entry of the holding part in the perforation or socket. In many situations a readily removable fastener is undesirable, though the ease of application of the fastener that characterizes snap or spring fasteners is desirable.

The present invention has for its primary purpose the provision of a spring or snap fastener constructed so that it may be assembled with the ease of a removable fastener, but is substantially incapable of removal by any reverse pull on the fastener, so that a substantially permanent connection may be effected with great facility.

Another object of the present invention is to provide a fastener designed to provide a substantially permanent or irremovable connection with supporting structures of varying thicknesses so that identical fasteners can be used when passed through material of varying thickness or varying supporting structures.

This invention also aims to provide an improved spring or snap fastener of the one-piece type, that has several legs each of which has a number of relatively wide holding shoulders spaced apart along the length of the legs a distance exceeding the thickness of the wall of the opening or socket so that said wall can be entered between adjacent shoulders in order that a substantial portion of the engaging shoulder may underlap the structure containing said opening or socket.

A still further object of the invention consists in providing a snap fastener having a shank consisting of two legs of unusual stiffness and tendency to expand within the opening or socket so that use may be made of these characteristics to insure certain engagement of the holding shoulders of the legs with the supporting structure.

Another object of the invention is to provide a spring fastener having a shank consisting of two legs disposed directly opposite each other in order that they may, if desirable, be brought into abutment to support each other laterally and thus substantially prevent further contraction of the shank by movement of said legs toward each other.

Still further objects of the invention will be made apparent as a description of the fastener proceeds with reference to the accompanying drawing in which:—

Figure 2 is a similar view looking in a direction at right angles to the direction from which Figure 1 is taken.

Figure 4:
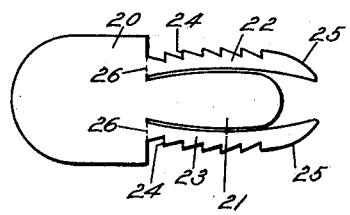
Figure 4 is a view of a blank from which a modified form of fastener may be constructed from sheet metal.
Figure 7:
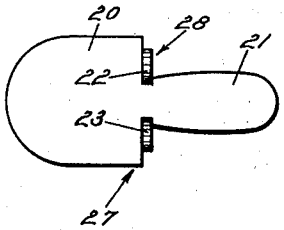
Figure 5:
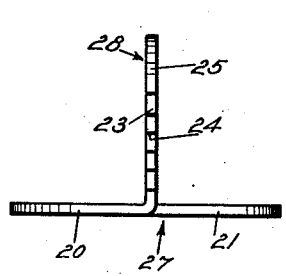
Figure 6:
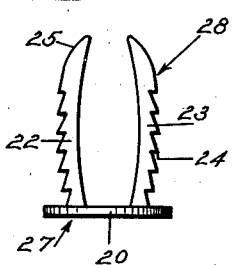

Figures 5, 6, and 7 are respectively side, end and bottom plan views of one form of fastener constructed from the blank illustrated in Figure 4.

Figure 8:
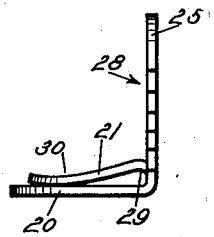

Figure 8 is a side view of a modified form of fastener constructed from the same blank.

Figure 9:
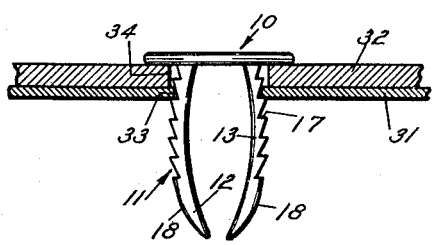

Figure 9 is a detailed sectional view indicating one manner in which the fastener of the present invention may be used.

Like reference characters indicate like parts throughout the several figures.

The fastener of the present invention is constructed from a single piece of wire or sheet metal. Fasteners constructed from wire, or a narrow strip of sheet metal, are illustrated in Figures 1, 2, 3, and 1A. Fasteners constructed from sheet metal by bends, all of which are made on lines located in the plane of the blank to bring parts of the metal blank out of their original plane are illustrated in Figures 4, 5, 6, 7, and 8.

Figure 1:
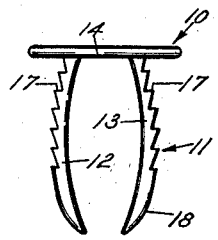
Figure 1 is a side view of a fastener of the present invention.
Figure 2:
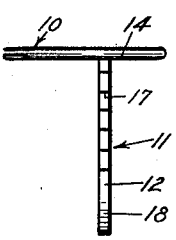
Figure 3:
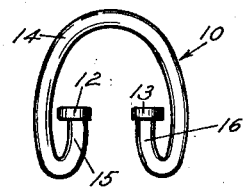
Figure 3 is a view of the fastener looking along the legs constituting the shank toward the head thereof.

The fastener of Figures 1, 2, and 3 comprises a head 10 and a shank 11. Shank 11 consists of two legs 12 and 13, which are formed from the ends of the strip of metal or wire from which the fastener is constructed. The head 10 is formed from the remainder of said piece of wire and comprises a loop 14 of any desired outline, but preferably substantially U-shaped, as illustrated in Figure 3. The head 10 also includes a pair of arms 15 and 16 that are preferably disposed substantially in the plane of the loop 14, said arms being formed by bending the portions of the wire adjacent the ends of the arms of the U inwardly within the loop 14 as illustrated. The arms 15 and 16 carry respectively the legs 12 and 13, the legs being bent into planes substantially at right angles to the plane of the head as illustrated.

Each of the legs 12 and 13 is provided with a multiplicity of holding shoulders 17, each shoulder 17 being spaced apart from the adjacent shoulder, along the length of the leg that carried it, a distance greater than the thickness of the metal constituting the supporting structure or the socket in which the fastener is intended to be snapped in the manner hereinafter pointed out. The shoulders 17 are also constructed so that they substantially parallel the head 10, when the fastener is in applied position, said shoulders being made relatively wide, that is of the order of about one thirty-second of an inch so as to present a relatively wide surface to the underside of the structure with which the fastener is engaged. The shoulders 17 are spaced apart along the length of the shank of the fastener a distance approximating one-sixteenth of an inch, and form, in effect, distinct teeth, each designed to firmly engage a corner of the wall formed by the opening in the supporting structure in which the fastener is designed to be engaged.

The legs 12 and 13 are further constructed so as to be outwardly bowed as illustrated, said legs slightly diverging from the head 10 toward the end of the shank and then converging toward said end. The convergent portions of the legs 12 and 13 are preferably constructed so as to be devoid of shoulders as indicated at 18 facilitating the entry of the fastener in the opening or socket in the manner hereinafter pointed out.

Figure 1A:
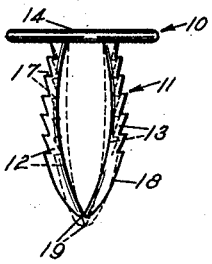
Figure 1A is a view similar to Figure 1, but showing a modified form of the fastener of Figure 1.

In the modified form of fastener illustrated in Figure 1A of the drawing, the legs 12 and 13 are formed so as to contact with each other at the tip of the shank as indicated at 19 so that each leg serves to provide lateral support for the other, at the end of the shank of the fastener, thus greatly increasing the stiffness of the shank of the fastener. In use, the legs of the fastener of this form of the invention assume a position approximating that illustrated in dotted lines in said figure, the contraction of the shank of the fastener being accomplished by a substantial straightening of the legs 12 and 13 with a consequent slight elongation of the length of the shank of the fastener. It will be understood that the legs of the fastener of this form of the invention are supported at both ends, by the arms 15 and 16 in the plane of the head 10 at one end, and by contact with each other at 19 at the other end of the shank. Upon contraction of said shank the arms 15 and 16 are put under torsion and the legs brought into dotted line position by flattening, the resilience of the metal from which the fastener is constructed permitting the shank of the fastener to assume the dotted line formation, though it will be understood that the torsion in the arms 15 and 16 and the contact of the legs at the point 19 causes the fastener of this form to have inherent in it a very decided tendency to resume its original condition, which tendency is effective when the fastener is in holding position to very firmly maintain the holding shoulders in engagement with the supporting structure.

A fastener that is the functional equivalent of that just described may be constructed from sheet metal. A blank from which such a fastener may be constructed is illustrated in Figure 4. The blank comprises a body 20 having a lateral extension 21 disposed between further lateral extensions from the body 20 designated 22 and 23. The lateral extensions 22 and 23 are provided with holding shoulders 24 in their edges along a substantial portion of the length thereof, the edges beyond the shoulders being smooth as indicated at 25.

It will be observed that the lateral extensions 22 and 23 correspond in form to the legs 12 and 13 of the fastener of Figure 1 and a fastener that is the functional equivalent of the fastener of Figure 1 may be constructed from the blank just described by bending the extensions 22 and 23 on the dotted lines 26 until they extend substantially at right angles to the plane of the body 20 and the remaining lateral extension 21. The fastener illustrated in detail in Figures 5, 6, and 7 thus results. The body 20 and extension 21 constitute the head 27 of the fastener while the bent extensions 22 and 23 constitute the legs of the shank 28 of the modified fastener.

The fastener of Figures 5, 6, and 7 has a flat head. If desired, a fastener having a head in the form of a hook may be readily constructed from the blank of Figure 4 by forming a U-bend 29 at the point where the lateral extension 21 is connected to the body 20, in a manner illustrated in Figure 8 of the drawing. The extension 21 may be curved and brought into contact with the body 20 providing a normally closed hook which, however, may be opened by springing the arm 30 of the hook away from the body 20, when it is desired to hook the fastener upon the material panel or trim strip which is to be secured thereby.

The fastener of the present invention is applied in the same manner in which any snap fastener is used, namely by forcing the shank of the fastener in the socket or opening provided to receive it. One way of using the fastener is illustrated in Figure 9 in which 31 designates a sheet metallic support, upon which it is desired to secure covering material 32 of any kind, by means of a snap fastener constructed in accordance with the present invention. The supporting structure 31 may be provided with a circular opening 33, or said opening may assume any other desired form, provided the cross dimension of the opening is materially less than the maximum width of the legs constituting the shank of the fastener. The covering material 32 may be provided with an opening 34 through which the shank of the fastener may be passed so that said shank may be engaged in the perforation 33 in the supporting structure 31. In securing the covering material in place the surfaces 18 of the fastener contact with the wall of the perforation 33 and when pressure is applied to the fastener to force the shank through said perforation the legs of the shank are wedged toward each other, setting up a torsion in the arms 15 and 16 that carry them. Inasmuch as no sharp shoulders are presented preventing the entry of the legs in the perforation 33 continued pressure will force the shank through said perforation until the head 10 of the fastener contacts with the outer surface of the covering material 32. As the legs are passed through the perforation the teeth will successively snap past the supporting structure and inasmuch as the legs 12 and 13 have a tendency to spring apart due to the torsion set up in the arms 15 and 16, finally one of the shoulders 17 will be brought in engagement with the side of the supporting structure 31 that is not in contact with the covering material 32. Inasmuch as the teeth are spaced apart a width substantially exceeding the thickness of the supporting structure with which the fastener is designed to be used, it will be understood that ample space is provided between adjacent teeth to receive the supporting structure and so that a relatively wide portion of shoulders 17 engage the inside of said structure. It will accordingly be clear that while the fastener may be brought into holding position with the same facility as any other snap fastener, nevertheless the holding effect of the fastener is positive, that is, the fastener cannot be withdrawn by a pull on the fastener in a direction opposite to that resulting in the application of the fastener as in most snap fastener constructions.

While the application of the fastener of Figures 1, 2, and 3 is illustrated in Figure 9, it will be understood that the fastener illustrated in Figures 5, 6, and 7 is used in precisely the same manner. The modified fastener of Figure 1A is also used in substantially the same manner though, for reasons above pointed out, the engagement of the shoulder 17 within a corner of the perforation of the supporting structure is still more positive than in fastener constructions in which the legs are not in contact with each other at the end of the shank.

The shank of the fastener of Figure 8 is applied to the covering material and supporting structure in the same manner as illustrated in Figure 9. However, when the fastener includes, as in the latter instance, a hook-like head the head is hooked upon an edge of the covering material 32 or through the opening 34 before the shank of the fastener is snapped in the perforation 33 in the manner already described.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:—

A one-piece spring stud fastener complete in itself and designed to be sprung into a perforation in a sheet metal structure, comprising a head and a shank consisting only of a pair of resilient legs disposed directly opposite each other with the ends of the legs remote from the head in close proximity, said legs having smooth edge surfaces that diverge from the end of the shank toward the head, and recesses formed in said legs from said edge surfaces of a width exceeding the thickness of said structure and providing sharply defined holding shoulders approximately normal to the length of said shank.

BION C. PLACE.